United States Patent
Augustin et al.

(10) Patent No.: US 8,927,634 B2
(45) Date of Patent: *Jan. 6, 2015

(54) PHTHALATE-FREE ISOCYANURATE FORMULATIONS

(75) Inventors: Thomas Augustin, Köln (DE); Josef Sanders, Leverkusen (DE)

(73) Assignee: LANXESS Deutschland GmbH, Cologne (DE)

( * ) Notice: Subject to any disclaimer, the term of this patent is extended or adjusted under 35 U.S.C. 154(b) by 331 days.

This patent is subject to a terminal disclaimer.

(21) Appl. No.: 13/577,280

(22) PCT Filed: Feb. 3, 2011

(86) PCT No.: PCT/EP2011/051612
§ 371 (c)(1),
(2), (4) Date: Dec. 20, 2012

(87) PCT Pub. No.: WO2011/095569
PCT Pub. Date: Aug. 11, 2011

(65) Prior Publication Data
US 2013/0090426 A1    Apr. 11, 2013

(30) Foreign Application Priority Data
Feb. 8, 2010   (EP) .................................... 10152965

(51) Int. Cl.
| | | |
|---|---|---|
| C09D 7/12 | (2006.01) | |
| C08G 18/02 | (2006.01) | |
| C08G 18/76 | (2006.01) | |
| C08G 18/79 | (2006.01) | |
| C08K 5/101 | (2006.01) | |
| C08K 5/3492 | (2006.01) | |
| C08G 18/18 | (2006.01) | |
| C08G 18/70 | (2006.01) | |
| C09D 127/06 | (2006.01) | |
| C08K 5/00 | (2006.01) | |
| C08K 5/10 | (2006.01) | |

(52) U.S. Cl.
CPC .......... *C08K 5/34924* (2013.01); *C08G 18/022* (2013.01); *C08G 18/18* (2013.01); *C08G 18/1825* (2013.01); *C08G 18/1841* (2013.01); *C08G 18/708* (2013.01); *C08G 18/791* (2013.01); *C08G 18/794* (2013.01); *C09D 127/06* (2013.01); *C08K 5/0016* (2013.01); *C08K 5/10* (2013.01)
USPC .......................................................... 524/197

(58) Field of Classification Search
CPC ........ C08G 18/02; C08G 18/76; C08G 18/79; C08K 5/101
USPC .......................................................... 524/197
See application file for complete search history.

(56) References Cited

U.S. PATENT DOCUMENTS

| | | |
|---|---|---|
| 3,996,223 A | 12/1976 | Gupta et al. |
| 4,115,373 A | 9/1978 | Henes et al. |
| 4,518,729 A | 5/1985 | Breidenbach et al. |
| 6,936,678 B2 | 8/2005 | Brahm et al. |
| 7,776,768 B2 | 8/2010 | Hansel et al. |
| 2008/0287613 A1 | 11/2008 | Simon et al. |
| 2013/0090426 A1 | 4/2013 | Augustin et al. |

FOREIGN PATENT DOCUMENTS

GB       1455701       11/1976

OTHER PUBLICATIONS

Tychopoulos, V. & Tyman, J.H.P. (1986) Enhancement of the Rate of Mannich Reactions in Aqueous Media, Synthetic Communications: An International Journal for Rapid Communication of Synthetic Organic Chemistry, 16:1, 1401-1409.
European Search Report from co-pending International Application PCT/EP2011/051612 dated Oct. 6, 2011, 4 pages.

*Primary Examiner* — Vu A Nguyen
(74) *Attorney, Agent, or Firm* — Jennifer R. Seng

(57) ABSTRACT

The present invention relates to novel low-monomer-content, low-viscosity, high-activity preparations made of isocyanurates containing isocyanate groups and of phthalate-free plasticizers, to use of the same as adhesion promoters with improved adhesion for coating compositions based on plasticized polyvinyl chloride, and also to coatings and coated substrates.

11 Claims, No Drawings

PHTHALATE-FREE ISOCYANURATE FORMULATIONS

The present invention relates to novel low-monomer-content, low-viscosity preparations made of isocyanurates containing isocyanate groups and of phthalate-free plasticizers, to use of the same as adhesion promoters for coating compositions based on plasticized polyvinyl chloride (PVC), and also to coatings and coated substrates.

It is known that the adhesion capability of plasticized PVC on substrates can be improved by adding, to the plasticized PVC, an adhesion promoter which contains isocyanate groups. This type of improved adhesion capability is important by way of example when the intention is to produce synthetic textile materials provided with a PVC covering. Preference is given to use, as adhesion promoters, of isocyanurates which contain isocyanate groups and which can be produced by oligomerization, in particular trimerization, from diisocyanates. The diisocyanates normally used for this purpose are the mixtures which have good commercial availability and which comprise the isomeric diisocyanatotoluenes (TDI), composed mainly of 2,4-diisocyanatotoluene (2,4-TDI) and 2,6-diisocyanatotoluene (2,6-TDI). These can easily be converted almost completely to isocyanurates containing isocyanate groups. Almost complete conversion is necessary because operator safety and product safety require that the residual content of diisocyanates in the adhesion promoter preparation is kept below 1.0% by weight, preferably below 0.5% by weight. Diisocyanatodiphenylmethanes (MDI) are likewise readily available but are less suitable, and are more difficult than TDI to trimerize and can therefore lead to undesirably high residual content of diisocyanates. Isocyanurates which contain isocyanate groups and which are based on MDI moreover exhibit poor solubility and tend to crystallize.

Isocyanurates which contain isocyanate groups are particularly easy to handle as adhesion promoters when they are used in the form of a solution in a plasticizer. In a practical method, the isocyanurates which contain isocyanate groups and are derived from TDI are likewise produced in the plasticizer used as solvent. These adhesion promoters and adhesion promoter preparations containing plasticizers are described by way of example in DE 24 19 016 A1(GB 1 455 701 A), as also are the preparation and use thereof.

For the purposes of the present invention, plasticizers are substances which on mixing with PVC, which is intrinsically hard and brittle, give a soft, tough material known as plasticized PVC. Examples of known plasticizers are the esters of phthalic acid, adipic acid or benzoic acid. Plasticized PVC can comprise large amounts of these plasticizers, sometimes more than 50% by weight of the plasticized PVC. Under service conditions, the plasticizer can separate at the surface or transfer into adjacent materials. When plasticized PVC is used there is therefore a risk of contamination of persons and of the environment by the plasticizer. In the light of these problems, there have recently been increasing requirements that the plasticizers used are harmless to humans and are not bioaccumulative.

According to European Union Directive 2005/84/EC, the plasticizers di(2-ethylhexyl)phthalate, dibutyl phthalate and benzyl butyl phthalate, for example, can no longer be used in toys or baby products, and the plasticizers diisononyl phthalate, diisodecyl phthalate and di-n-octyl phthalate can no longer be used in toys or baby products which can be placed in children's mouths. In view of these restrictions, which many consumers may regard as worrying and difficult to understand, many producers are proceeding towards general elimination of phthalate-containing plasticizers in the production of plasticized PVC. There is therefore a requirement for phthalate-free plasticizers which achieve the performance level of phthalate-containing plasticizers in relation to processability and service properties.

For the purposes of the present invention, phthalate-free plasticizers are plasticizers which comprise no dialkyl phthalates, in particular plasticizers which comprise less than 0.1% by weight of dialkyl phthalates.

Elimination of phthalate-containing plasticizers has now also become a requirement placed upon adhesion promoter preparations which contain plasticizer, in particular for sensitive applications, such as toys or baby products. There is therefore a major requirement for adhesion promoter preparations which comprise no phthalates but nevertheless have the good adhesion properties of phthalate-containing adhesion promoter preparations of the prior art. A further demand is that the preparations are clear and free from solids, comprise no volatile solvents and have viscosity below 30 000 mPas, preferably less than 20 000 mPas, at 23° C. that is necessary for good processability. Residual content of diisocyanates is intended to be less than 1.0% by weight, preferably less than 0.5% by weight. No prior art, not even DE 10 2007 034 977 A1, has hitherto described any combination of all of these product properties.

The adhesion promoter preparations based on diisononyl phthalate and described in WO 2005 70984 A1 are therefore no longer suitable for sensitive applications. DE 25 51 634 A 1 and EP 1 378 529 A1 maintain that isocyanurates which contain isocyanate groups and which are suitable as adhesion promoters, based on TDI, can be produced in any desired solvents, among which are phthalate-free plasticizers. However, the comparative examples given hereinafter show that by no means all phthalate-free plasticizers give adhesion promoter preparations which meet the requirements described. This also applies to the plasticizers described in DE 10 2007 034 977, based on alkylsulphonic ester of phenol (ASE), which are marketed with trade mark Mesamoll®. DE 30 41 732 A1 describes solutions which are suitable as adhesion promoters which comprise isocyanurates containing isocyanate groups, but these are produced from MDI. These solutions are unsuitable, for the abovementioned reasons.

It was therefore an object of the present invention to provide, as adhesion promoters, suitable preparations of isocyanurates which contain isocyanate groups and which, although they comprise phthalate-free plasticizers, have mechanical properties, e.g. bond strengths, that achieve the level of the phthalate-containing adhesion-promoter preparations of WO 2005 70984 A1. The intention is that the isocyanurates containing isocyanate groups be based on TDI isomer mixtures that are available on a large industrial scale. The preparations are intended to be clear, their viscosity is intended to be <30 000 mPas at 23° C., preferably <20 000 mPas, and content of free TDI (all isomers) is intended to be <1.0% by weight, preferably <0.5% by weight.

Preparations characterized in that they comprise A) from 15 to 50% by weight isocyanurates containing isocyanate groups and B) from 85 to 50% by weight of n- or isoalkyl monobenzoates, with the proviso that
i) the isocyanurate containing isocyanate groups is produced through trimerization of a mixture of 2,4-diisocyanatotoluene and 2,6-diisocyanatotoluene and
ii) the total of all the percentages by weight is 100%
achieve the object and are therefore provided by the present invention.

In one preferred embodiment of the invention, the preparations comprise from 20 to 35% by weight of isocyanurates containing isocyanate groups and from 80 to 65% by weight of n- or isoalkyl monobenzoates, preferably n- or isononyl benzoates.

Mixtures available on a large industrial scale and consisting essentially of 2,4-TDI and 2,6-TDI are used to produce component A). The mixtures are mixtures of isomeric diisocyanatotoluenes comprising from 65 to 95% by weight of 2,4-diisocyanatotoluene and from 5 to 35% by weight of 2,6-diisocyanatotoluene, and are produced with catalysis by phenolic catalysts comprising dialkylamino groups. It is preferable that the TDI isomer mixtures comprise from 75 to 85% by weight of 2,4-TDI in a mixture with from 15 to 25% by weight of 2,6-TDI. The product Desmodur® T80 obtainable commercially from Bayer MaterialScience AG is an example of these TDI isomer mixtures that are preferably to be used.

At least one Mannich base can be used as catalyst for initiating and accelerating the trimerization reaction for producing component A), where these also lead to selective incorporation of TDI at higher temperatures. Catalyst systems of this type have phenolic OH groups and N,N-diallcy-laminomethyl groups bonded to aromatic systems (alkyl: C1-C3-alkyl chain and/or alkylene chain having from 1 to 18 carbon atoms, where these optionally have oxygen or sulphur as separator).

These can be groups distributed over a plurality of molecules or positioned on one or more aromatic rings. Compounds used as catalyst systems are preferably those which comprise not only hydroxyl groups but also aminomethyl groups in a molecule.

It is particularly preferable to use systems which have C1-C3-dialkylaminomethyl groups in ortho-position with respect to aromatic hydroxy groups.

The synthesis of Mannich bases suitable as catalysts is described by way of example in DE 25 51 634 A1 and WO 2005 70984 A1. Mannich bases to be used with preference are those based on phenol, p-isononylphenol or bisphenol A, where these are obtained via reaction with dimethylamine and formaldehyde, e.g. as in DE-A 2 452 531 or Synth. Commun. (1986), 16, 1401-9. Particular preference is given to Mannich bases based on phenol or bisphenol A.

The catalysts to be used in the form of Mannich bases are used in the form of pure substance or in solution, preferably in a plurality of small portions, or continuously.

Component A) is produced via trimerization of the diisocyanate mixtures by known processes described by way of example in WO 2005 70984 A1.

The trimerization is carried out in the presence of plasticizer component B). The trimerization reaction takes place in the temperature range from 40 to 140° C., preferably from 40 to 80° C. When the content of free TDI in the reaction mixture is below 1.0% by weight, preferably below 0.5% by weight, the trimerization is terminated via thermal decomposition of the catalyst or else preferably via addition of a catalyst poison. The product then comprises from 3 to 7% by weight, preferably from 4.5 to 6% by weight, of isocyanate groups.

It is preferable that the trimerization reaction is finally terminated via addition of at least one catalyst poison. Catalyst poisons preferred for this purpose are those from the group of the protic acids, acyl chlorides or methylating compounds. It is particularly preferably to use alkyl phosphates, in particular dibutyl phosphate, or methyl toluenesulphonate. The preparations of the invention comprise from 0.02 to 4% by weight, preferably from 0.1 to 2% by weight, and particularly preferably from 0.2 to 1% by weight, of the catalyst poison(s).

The n- or isoalkyl benzoate of component B) to be used as plasticizer in the preparation according to the invention preferably comprises <0.1% by weight of dialkyl phthalates and >0.1% by weight of n- or isoalkyl benzoate. The n- or isoalkyl monobenzoates can be produced via esterification of benzoic acid with monofunctional linear or branched alkyl alcohols, preferably C7- to C10-alcohols.

In one particularly preferred embodiment of the invention, component B) used comprises >90% by weight of n- or isononyl benzoate. The C9 alcohols required for the synthesis are preferably nonanols from the group n-nonanol, methylisopropylpentanol, methylpropylpentanol, trimethylhexanol, ethylmethylhexanol, propylhexanol, dimethylheptanol, ethylheptanol, methyloctanol.

A particularly preferred component B) is a mixture of n- and isononanol benzoates characterized in that only a small proportion of 3,5,5-trimethylhexanol benzoate is present.

A very particularly preferred component B) is a mixture of n- and isononanol benzoates characterized in that a proportion of <10 mol % of 3,5,5-trimethylhexanol benzoate is present.

In one preferred embodiment, preparations according to the invention also comprise, by virtue of the production process, in addition to A) and B), from 0.01 to 2% by weight, particularly preferably from 0.05 to 1% by weight, of Mannich base(s) or degradation products thereof and/or from 0.01 to 2% by weight of catalyst poison.

For clarification, it should be noted that the scope of this invention encompasses any desired combination of all of the definitions and parameters listed in the present disclosure, in general terms or in preferred ranges.

The preparations according to the invention are clear, slightly yellowish to yellowish liquids with surprising shelf life, which, even after storage for a number of weeks, have no tendency towards crystallization or towards formation of precipitates or phase separation. They moreover feature extremely low content of free TDI, even after storage, and this is a particular advantage of the preparations according to the invention, because this is a relatively low-boiling-point diisocyanate which presents a toxicological risk.

Preparations which are suitable as adhesion promoters and which can comprise isocyanurates containing isocyanate groups are best produced in the prior art through trimerization of diisocyanates in the plasticizer, and the course of the trimerization reaction is influenced not only by the catalyst but also, for example, by the plasticizer used, and the isomer constitution of the TDI, and it could not therefore have been expected that specifically the combination, essential to the invention, of plasticizer, catalyst and maximum amount of 2,6-TDI would provide adhesion-promoter preparations with the properties demanded. Indeed, Comparative Examples 1 to 6 given below show that the object underlying this invention cannot be achieved with any desired phthalate-free plasticizers.

However, the present invention also provides a process for producing the preparations according to the invention, characterized in that the trimerization of the TDI mixture to give component A) takes place in the temperature range from 40 to 140° C., preferably 40 to 80° C., in the presence of plasticizer component B) and the presence of at least one Mannich base functioning as catalyst, and as soon as the content of free TDI in the reaction mixture is below 1.0% by weight, preferably below 0.5% by weight, the trimerization is terminated through thermal decomposition of the catalyst or through addition of at least one catalyst poison, with complete or partial deactivation of the catalyst. According to the invention, it is preferable to use a catalyst poison to terminate the trimerization. It is particularly preferable to use alkyl phosphates, in particular dibutyl phosphate or methyl toluenesulphonate, as catalyst poison. The process according to the invention preferably gives preparations according to the invention which then comprise from 3 to 7% by weight, preferably from 4.5 to 6% by weight, of isocyanate groups.

The preparations according to the invention are suitable as adhesion promoters for plasticized PVC and in particular as adhesion-promoting additives for PVC plastisols. The preparations according to the invention are particularly advantageously used as adhesion promoters between substrates made of synthetic fibres having groups reactive towards isocyanate groups, e.g. polyamide fibres or polyester fibres, and PVC plastisols or flexible PVC melts. The solutions according to the invention can, of course, also be used to improve the adhesion of plasticized PVC or PVC plastisols on sheet-like substrates, for example on foils.

The present invention therefore also provides the use of the preparations according to the invention as adhesion promoters for coating compositions based on plasticized PVC.

In an example of a procedure for the use according to the invention of the preparations according to the invention, the preparations according to the invention are printed, doctored, screened or sprayed, or applied by dip-coating, onto the substrates to be coated. As a function of the item to be produced, one or more adhesion-promoter-free PVC layers are applied, e.g. as plastisols or by extrusion coating or hot melt coating or by lamination, to the substrate surfaces thus pretreated. The preparations according to the invention can also particularly preferably be added to a PVC plastisol prior to application of the same.

The amounts used of the preparations according to the invention are normally such that, based on plasticizer-free PVC on the coating composition, from 0.5 to 200% by weight of isocyanurates containing isocyanate groups is present, preferably from 2 to 30% by weight. However, the amounts used of the solutions according to the invention can also be any desired other amounts appropriate to the respective application sector.

The production of the finished layers, i.e. the reaction of the isocyanate groups of the adhesion promoter with the substrate, and the gelling of the PVC layer, takes place independently of the type of application in a conventional manner at relatively high temperatures, using temperatures of from 110 to 210° C. as a function of the constitution of the PVC layers.

The present invention further provides coatings and coated substrates for textiles or fabrics, where these are obtainable with use of the adhesion-promoter preparations described above. The preparations according to the invention are suitable as adhesion promoters for coatings based on plasticized PVC, in particular for producing tarpaulins, billboards, air-supported structures and other textile buildings, flexible containers, polygonal roofs, awnings, protective apparel, conveyor belts, flock carpets or foamed synthetic leather. The preparations according to the invention have particularly good suitability as adhesion-promoting additions in the coating of substrates having groups reactive towards isocyanate groups, in particular during the coating of yarns, mats and fabrics made of polyester fibres or of polyamide fibres.

The examples below provide further explanation of the invention, but are not intended to restrict the invention.

Unless otherwise stated, all parts and percentages are based on the weight.

Properties determined on the products were solids content (thick-layer method: lid, 1 g of specimen, 1 h, 125° C., convection oven, method based on DIN EN ISO 3251), viscosity at 23° C. (VT550 rotary viscometer from Haake GmbH, Karlsruhe), and free TDI content (gas chromatography, Hewlett Packard 5890 in accordance with DIN ISO 55956). Isocyanate content was determined in accordance with EN ISO 11909.

Starting Materials

Desmodur® T80: TDI isomer mixture made of 80% by weight of 2,4-TDI and 20% by weight of 2,6-TDI, Bayer MaterialScience AG.

Vestinol® 9 DINP: diisononyl phthalate, Oxeno GmbH.

Vestinol® INB: isononyl benzoate, Evonik.

Benzoflex® 2088: mixture of diethylene glycol dibenzoate, triethylene glycol dibenzoate and dipropylene glycol dibenzoate, Velsicol Chemical Corp.

Unimoll® AGF: acetylated glycerol acetate, Lanxess Deutschland GmbH.

Mesamoll® II: phenol alkanesulfonate with ≤0.25% by weight of volatile paraffinic compounds, Lanxess Deutschland GmbH.

Catalyst production: (by analogy in accordance with DE 24 52 532 A1): 94 parts by weight of phenol were heated to 80° C. with 692 parts by weight of a 25% strength aqueous dimethylamine solution and 408 parts by weight of a 40% strength aqueous formaldehyde solution for two hours. After cooling, the organic phase was isolated and concentrated by evaporation at 90° C. and 15 mbar. The residue was dissolved in xylene and adjusted to 80% Mannich base concentration. The quantitative data in the examples below are based on this catalyst solution.

COMPARATIVE EXAMPLE 1

Not According to the Invention 180 parts by weight of Desmodur® T80 were trimerized at 50° C. in 504 parts by weight of Vestinol® 9 DINP with 2.9 parts by weight of the catalyst solution. After 84 hours, the reaction was interrupted by adding 4.7 parts by weight of methyl toluenesulfonate, and stirring was continued for three hours at from 60 to 70° C. This gave a clear solution with 4.7% by weight isocyanate content, viscosity of 5700 mPas at 23° C. and 0.16% by weight free TDI content.

COMPARATIVE EXAMPLE 2

Not According to the Invention 180 parts by weight of Desmodur® T80 were trimerized at 55° C. in 378 parts by weight of Vestinol® 9 DINP with 1.6 parts by weight of the catalyst solution. After 72 hours, the reaction was interrupted by adding 2.6 parts by weight of methyl toluenesulfonate, and stirring was continued for three hours at from 60 to 70° C. This gave a clear solution with 5.53% by weight isocyanate content, viscosity of 41 400 mPas at 23° C. and 0.14% by weight free TDI content.

COMPARATIVE EXAMPLE 3

Not According to the Invention 180 parts by weight of Desmodur® T80 were trimerized at 55° C. in 415 parts by weight of Benzoflex® 2088 with 0.7 part by weight of the catalyst solution. After 84 hours, the reaction was interrupted by adding 1.7 parts by weight of methyl toluenesulfonate, and stirring was continued for three hours at from 60 to 70° C. This gave a clear solution with 4.8% by weight isocyanate content, viscosity of >200 000 mPas at 23° C. and 1.09% by weight free TDI content.

COMPARATIVE EXAMPLE 4

Not According to the Invention 180 parts by weight of Desmodur® T80 were trimerized at 55° C. in 504 parts by weight of Mesomoll® II with 2.9 parts by weight of the catalyst solution. After 72 hours, the reaction was interrupted by adding 4.7 parts by weight of methyl toluenesulfonate, and stirring was continued for three hours at from 60 to 70° C. This gave a clear solution with 4.8% by weight isocyanate content, viscosity of 11 600 mPas at 23° C. and 0.25% by weight free TDI content.

COMPARATIVE EXAMPLE 5

Not According to the Invention 180 parts by weight of Desmodur® T80 were trimerized at 55° C. in 378 parts by weight of Mesamoll® II with 1.5 parts by weight of the catalyst solution. After 72 hours, the reaction was interrupted by adding 2.6 parts by weight of methyl toluenesulfonate, and stirring was continued for three hours at from 60 to 70° C. This gave a clear solution with 5.31% by weight isocyanate content, viscosity of >300 000 mPas at 23° C. and 0.15% by weight free TDI content.

COMPARATIVE EXAMPLE 6

Not According to the Invention 180 parts by weight of Desmodur® T80 were trimerized at 55° C. in 378 parts by weight of Unimoll® AGF with 1.5 parts by weight of the catalyst solution. After 72 hours, the reaction was interrupted by adding 2.6 parts by weight of methyl toluenesulfonate, and stirring was continued for three hours at from 60 to 70° C. This gave a clear solution with 4.9% by weight isocyanate content, viscosity of 35 400 mPas at 23° C. and 0.42% by weight free TDI content.

Comparative Example 1 corresponds to Example 2 of EP 1 711 546 A1 and serves to permit comparison of the properties of the adhesion-promoter preparations according to the invention with the prior art. Comparative Example 2 shows that the increase in TDI trimer content to about 32% by weight leads to a prohibitive viscosity increase when a plasticizer not according to the invention is used. As is further shown by Comparative Examples 1 to 6 not according to the invention, the selection of the plasticizer has a decisive influence on the trimerization result. The desired property combination cannot therefore be achieved through use of the phthalate-free plasticizers described in the prior art, or can be achieved therewith only if the concentration of TDI trimer does not exceed about 27% by weight. The adhesion promoters can either lose processability because of their high viscosity or give inadequate bond strengths because their concentration of TDI trimer is too low (see below).

INVENTIVE EXAMPLE 1

According to the Invention 180 parts by weight of Desmodur® T80 were trimerized at 55° C. in 378 parts by weight of Vestinol® INB with 1.5 parts by weight of the catalyst solution. After 72 hours, the reaction was interrupted by adding 2.6 parts by weight of methyl toluenesulfonate, and stirring was continued for three hours at from 60 to 70° C. This gave a clear solution with 5.43% by weight isocyanate content, viscosity of 11 040 mPas at 23° C. and 0.31% by weight free TDI content.

Performance Testing and Test Results:

In a test system that provides a good simulation of practical conditions, polyester fabric was provided with a PVC plastisol/adhesion promoter coating. The bond strength of the said coating was then determined on a standardized test strip. For this, a doctor was used to provide polyester fabric with an adhesion-promoter-containing adhesion coat and with an adhesion-promoter-free top coat with otherwise identical constitution. These coatings were gelled in an oven and passed onward for testing. In the bond strength test, two test strips were mutually superposed (PVC side on PVC side), pressed at low pressure and tested by using a tensile machine.

Test Equipment:
Balance: precision min. 0.1 g
Stirrer: high-rotation-rate stirrer bar
Labcoater from Mathis AG Zürich
Ametec LR5 K plus tensile machine
Polyester fabric: standard polyester 1100 dtex L 9/9 Z 60 fabric The test used test specimens of fabric measuring about 40×25 cm.

Constitution of PVC Plastisol:
70 parts of Vestolit® B 7021 Ultra paste PVC; Vestolit GmbH; Marl
30 parts of Vestolit® E 7031 paste PVC; Vestolit GmbH; Marl
33 parts of Mesamoll® ASEP plasticizer; Lanxess Deutschland GmbH
33 parts of Vestinol® 9 DINP plasticizer; Evonik Oxeno GmbH, Marl
10 parts of Durcal® 5 chalk; Omya GmbH; Cologne
2.5 parts of Mark® BZ 513 stabilizer; Crompton Vinyl Additives GmbH; Lampertheim
1.5 parts of Kronos® 2220 titanium dioxide; Kronos Titan GmbH; Leverkusen Test Specimens:

| | | |
|---|---|---|
| 1st adhesion coat | about 120 g/m² | 140° C./2 min |
| 2nd top coat | about 120 g/m² | 140° C./2 min |

The test specimens were pressed for 2 min at 180° C. and fused.

Dimension: width 5 cm×length 25 cm in weft direction
Testing with Ametec LR5 K plus tensile machine The PVC plastisol was produced by mixing the starting materials listed above under "Constitution of PVC plastisol" in a Drais mixer by stirring for 2.5 hours at maximum rotation rate, with water cooling and in vacua.

Adhesion:

The said specimens were then used to determine bond strengths by using a Lloyd M 5 K tensile machine. The resultant bond strength values are the force in Newtons required to peel 10 cm of the coating from the backing fabric (peeling test, shown in the table as Activity). The values stated in the table were obtained by taking an average of at least three individual measurements.

As shown by the results for Inventive Example 1, the use of the phthalate-free adhesion-promoter preparations according to the invention provides bond strength values higher than those achieved with the phthalate-containing adhesion-promoter preparation of the prior art (Comparative Examples 1 and 2). The adhesion promoters of Comparative Examples 2, 3, 5 and 6 were not suitable for further processing, since these either had excessively high visosity (Comparative Examples 3 and 5) or had low processability (Comparative Examples 2 and 6) and in all cases, including Comparative Example 4, adhesion was not sufficient to give homogeneous coatings.

Test Results:

| Example | | Viscosity | Activity |
|---|---|---|---|
| Comparative Example 1 | not according to the invention | 5700 mPas | 153 |
| Comparative Example 2 | not according to the invention | 41 400 mPas | 156 |
| Comparative Example 3 | not according to the invention | >200 000 mPas | could not be tested |
| Comparative Example 4 | not according to the invention | 11 600 mPas | 148 |
| Comparative Example 5 | not according to the invention | >300 000 mPas | could not be tested |
| Comparative Example 6 | not according to the invention | 35 400 mPas | 133 |
| Inventive Example 1 | according to the invention | 11 000 mPas | 171 |

What is claimed is:

1. A composition comprising:
   A) from 15 to 50% by weight isocyanurate containing isocyanate groups,
   B) from 85 to 50% by weight n-alkyl monobenzoates or isoalkyl monobenzoates, with the proviso that:
   i) the isocyanurate containing isocyanate groups is produced by trimerization of a mixture of 2,4-diisocyanatotoluene (2,4-TDI) and 2,6-diisocyanatotoluene (2,6-TDI); and
   ii) the total of all the percentages by weight is 100%.

2. The composition of claim 1 comprising 20 to 35% by weight of the isocyanurate containing isocyanate groups and 80 to 65% by weight of n-alkyl monobenzoates or isoalkyl monobenzoates, based on the total weight of the composition.

3. The composition of claim 1, wherein the isocyanurate containing isocyanate groups is produced from a mixture comprising 65 to 95% by weight of 2,4-TDI and 5 to 35% by weight of 2,6-TDI, and catalyzed by phenolic catalysts comprising dialkylamino groups.

4. The composition of claim 1, wherein the n-alkyl monobenzoates or isoalkyl monobenzoates comprise greater than 90% by weight n-nonyl benzoate or isononyl benzoate.

5. An adhesion promoter for coating compositions based on plasticized polyvinyl chloride comprising the composition of claim 1.

6. A substrate comprising the adhesion promoter of claim 5.

7. An article comprising the substrate of claim 6, wherein the article is selected from the group consisting of tarpaulins, billboards, air-supported structures and other textile structures, flexible containers, polygonal roofs, awnings, protective apparel, conveyor belts, flock carpets and foamed synthetic leather.

8. The substrate of claim 6, wherein the substrate has an underlying structure comprising textiles or fabrics.

9. The substrate of claim 8, wherein the fabrics are textile polyester fabrics or textile polyamide fabrics.

10. A process for production of the composition of claim 1, comprising trimerizing a mixture of 2,4-TDI and 2,6-TDI to produce component A) at a temperature of 40° C. to 140° C. in the presence of plasticizer component B) and in the presence of at least one Mannich base functioning as catalyst, and terminating the trimerization, when the content of free TDI in the reaction mixture is below 1.0% by weight, with complete or partial deactivation of the catalyst by thermal decomposition of the catalyst or by addition of protic acids, acyl chlorides, alkyl phosphates, dibutyl phosphate or methyl toluenesulfonate.

11. A coating composition comprising the composition of claim 1.

* * * * *